US012800198B2

(12) United States Patent
Lee et al.

(10) Patent No.: US 12,800,198 B2
(45) Date of Patent: Nov. 17, 2026

(54) ELECTRIC COMPRESSOR

(71) Applicant: Hanon Systems, Daejeon (KR)

(72) Inventors: Hyun Woo Lee, Daejeon (KR); Sang Woo Bae, Daejeon (KR); Hye Rim An, Daejeon (KR); Sung Taeg Oh, Daejeon (KR); Woo Jin Choi, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 19/262,751

(22) Filed: Jul. 8, 2025

(65) Prior Publication Data

US 2026/0104187 A1 Apr. 16, 2026

(30) Foreign Application Priority Data

Oct. 14, 2024 (KR) ........................ 10-2024-0139698

(51) Int. Cl.

*H02K 5/22* (2006.01)
*F04D 25/06* (2006.01)
*F25B 31/02* (2006.01)
*H02K 11/33* (2016.01)

(52) U.S. Cl.

CPC ............ *F25B 31/02* (2013.01); *F04D 25/068* (2013.01); *H02K 5/225* (2013.01); *H02K 11/33* (2016.01); *F04C 2240/403* (2013.01); *F04C 2240/808* (2013.01); *H02K 2211/03* (2013.01)

(58) Field of Classification Search

CPC .... H02K 5/225; F04D 25/068; H01R 13/5205
See application file for complete search history.

(56) References Cited

U.S. PATENT DOCUMENTS

| | | | | |
|---|---|---|---|---|
| 2015/0054365 A1* | 2/2015 | Kinoshita | ................ | H02K 5/10 310/71 |
| 2018/0091016 A1* | 3/2018 | Fujii | ........................ | F25B 31/02 |
| 2022/0304178 A1* | 9/2022 | Okada | .................... | H02K 5/225 |

* cited by examiner

*Primary Examiner* — Kenneth J Hansen
(74) *Attorney, Agent, or Firm* — Shumaker, Loop & Kendrick, LLP

(57) ABSTRACT

An electric compressor, including: a housing; a compression mechanism configured to compress a refrigerant in the housing; a motor configured to generate power needed for driving the compression mechanism; and an inverter including a printed circuit board configured to control the motor and a connector configured to connect the printed circuit board to an external device, and the housing may include an inverter body including a printed circuit board receiving part configured to receive the printed circuit board; and a connector receiving part configured to receive the connector so as to receive the inverter, and the electric compressor may further include a resin member injected to the inverter body and united thereto, and the electric compressor may save the costs required for assembling the inverter.

17 Claims, 14 Drawing Sheets

ELECTRIC COMPRESSOR

CROSS-REFERENCE TO RELATED APPLICATION

This application is based on and claims the benefit of and priority under 35 U.S.C. § 119 to Korean Patent Application No. 10-2024-0139698, filed on Oct. 14, 2024, in the Korean Intellectual Property Office, the disclosure of which is incorporated by reference herein in its entirety.

FIELD OF THE INVENTION

One or more embodiments relate to an electric compressor, more particularly, to an electric compressor configured to compress a refrigerant by a drive force of a motor controlled by an inverter.

BACKGROUND

One or more embodiments relate to an electric compressor, more particularly, to an electric compressor configured to compress a refrigerant by a drive force of a motor controlled by an inverter.

Generally, a compressor is an apparatus compressing a fluid such as a refrigerant gas and the like, and is applied to an air conditioning (A/C) system of a building, a vehicle, and the like.

The compressor is classified into a reciprocating compressor that compresses a refrigerant according to which pistons reciprocate, and a rotary compressor that compresses a refrigerant while rotating. The reciprocating compressor includes a crank compressor that transmits a driving force from a drive source to a plurality of pistons using a crank, a swash plate compressor that transmits a driving force from a drive source to a shaft installed with a swash plate, and the like, according to the power transmission from the drive source. The rotary compressor includes a vane rotary compressor that utilizes a rotating rotary shaft and vane, and a scroll compressor that utilizes an orbiting scroll and a fixed scroll.

In addition, depending on a driving method, the compressors may be classified into a mechanical compressor that uses an engine and an electric compressor that uses a motor (hereinafter, an electric compressor).

Here, an inverter configured to control the motor so as to regulate a compression capacity is applied to the electric compressor.

FIG. 1 is a cross-sectional view of a conventional electric compressor, FIG. 2 is an exploded cross-sectional view illustrating an inverter side of the electric compressor of FIG. 1, and FIG. 3 is a right side view illustrating connectors of the electric compressor of FIG. 1.

Referring to FIGS. 1 to 3, the conventional electric compressor includes a housing 10, a compression mechanism 20 configured to compress a refrigerant in the housing 10, a motor 30 configured to generate power needed in driving the compression mechanism 20, and an inverter 40 configured to control the motor 30.

However, in the conventional electric compressor, there is a problem in that costs required for assembling the inverter 40 increase.

In more detail, the housing 10 includes an integrally formed motor-inverter body 12 including a motor receiving space in which the motor 30 is received and an inverter receiving space in which the inverter 40 is received, the inverter 40 includes a printed circuit board 41 and connectors 43 and 44 for connecting the printed circuit board 41 to an external device, and the connectors 43 and 44 are fixed by fastening members 72 and 74 penetrating the connectors 43 and 44 and fastened to the integrally formed motor-inverter body 12. Here, the connectors 43 and 44 include a high-voltage connector 43 connected to a high-voltage conduction unit for supplying electric power to the inverter 40, and a low-voltage connector 44 connected to a low-voltage conduction unit for communication with the inverter 40, the high-voltage connector 43 is fixed by a fastening member 72, and the low-voltage connector 44 is fixed by a fastening member 74, therefore, there are many components and costs increase.

In addition, the housing 10 further includes an inverter cover for covering the inverter receiving space, the inverter cover 15 is fixed by a fastening member 50 penetrating the inverter cover 15 and fastened to the integrally formed motor-inverter body 12, and the printed circuit board 41 is fixed by a fastening member 80 penetrating the printed circuit board 41 and fastened to the integrally formed motor-inverter body 12. Here, the fastening member 80 for fixing the printed circuit board is provided apart from the fastening member 50 for fixing the inverter cover 15, and the costs further increase.

Moreover, when an insulation paper for preventing electrical breakdown of elements mounted in the printed circuit board 41, a fixing means for preventing the elements from leaving the printed circuit board 41, and the like are added, the costs further increase.

SUMMARY OF THE INVENTION

An object of the present disclosure is to provide an electric compressor capable of saving costs required for assembling the inverter.

One embodiment is an electric compressor, including: a housing; a compression mechanism configured to compress a refrigerant in the housing; a motor configured to generate power needed for driving the compression mechanism; and an inverter including a printed circuit board configured to control the motor and a connector configured to connect the printed circuit board to an external device, and the housing may include an inverter body including a printed circuit board receiving part configured to receive the printed circuit board; and a connector receiving part configured to receive the connector so as to receive the inverter, and the electric compressor may further include a resin member injected to the inverter body and united thereto.

The resin member may include a first resin member injected to the connector receiving part and united thereto.

The connector receiving part may include: a connector hole penetrated by the connector; and a connector plate in which the connector hole is formed, and the first resin member may include: a first resin member first portion integrally formed with the connector; and a first resin member second portion surrounding the first resin member first portion and formed on the connector plate around the connector hole.

Elements mounted on the printed circuit board may include an element which needs insulation with the connector plate, and the first resin member second portion may be disposed between the element which needs insulation with the connector plate and the connector plate.

The connector plate may include a connector plate inner surface oriented toward the printed circuit board and a connector plate outer surface forming a rear surface of the connector plate inner surface, the connector hole may include an inner connector hole recessed from the connector plate inner surface and an outer connector hole recessed from the connector plate outer surface and communicated with the inner connector hole, an inner diameter of the outer connector hole may be formed greater than an inner diameter of the inner connector hole and a connector hole stepped surface is formed between the outer connector hole and the inner connector hole, and the first resin member first portion may be injected to a portion surrounding the inner connector hole of the connector plate inner surface, the inner connector hole, the connector hole stepped surface, and the outer connector hole and united thereto.

The connector plate may include a connector plate inner surface oriented toward the printed circuit board, and the first resin member second portion may be injected to a portion surrounding the connector hole of the connector plate inner surface and united thereto.

The resin member may further include a second resin member injected to the printed circuit board receiving part and united thereto.

The printed circuit board receiving part may include an annular side plate forming a space accommodating the printed circuit board and a support plate extending from an inner circumferential portion of the side plate and supporting the printed circuit board, the support plate may include an element receiving hole penetrating the support plate, and the second resin member may include a second resin member first portion formed in the element receiving hole and a second resin member second portion surrounding the second resin member first portion and formed on the support plate around the element receiving hole.

The support plate may further include a support plate inner surface oriented toward the printed circuit board and a support plate outer surface forming a rear surface of the support plate inner surface, the element receiving hole may include an inner element receiving hole recessed from the support plate inner surface, and an outer element receiving hole recessed from the support plate outer surface and communicated with the inner element receiving hole, an inner diameter of the outer element receiving hole may be formed greater than an inner diameter of the inner element receiving hole and an element receiving hole stepped surface may be formed between the outer element receiving hole and the inner element receiving hole, and the second resin member first portion may be injected to a portion surrounding the inner element receiving hole of the support plate inner surface, the inner element receiving hole, the element receiving hole stepped surface, and the outer element receiving hole and united thereto.

The support plate may further include a support plate inner surface oriented toward the printed circuit board, and the second resin member second portion may be injected to a portion surrounding the element receiving hole of the support plate inner surface and united thereto.

Elements mounted on the printed circuit board may include a plurality of switching elements, and the second resin member second portion may include a leadwire insulating portion interposed between a leadwire of the switching element and the support plate inner surface.

The leadwire insulating portion may be spaced apart from the leadwire by a predetermined distance.

The leadwire may include a first leadwire protruding toward one side of the switching element and a second leadwire protruding toward another side of the switching element, the leadwire insulating portion may include a first leadwire insulating portion interposed between the first leadwire and the support plate inner surface and a second leadwire insulating portion interposed between the second leadwire and the support plate inner surface, and the first leadwire insulating portion with respect to a switching element may be adjacent to the second leadwire insulating portion with respect to a switching element adjacent to the switching element, and the second leadwire insulating portion with respect to the switching element may be adjacent to the first leadwire insulating portion with respect to a switching element adjacent to the switching element.

The second resin member second portion may further include an inter-switching element insulating portion interposed between a switching element and a switching element adjacent to the switching element.

The second resin member second portion may further include a body exposing portion configured to expose a body of the switching element to the support plate inner surface, and a gap filler or a thermal grease may be interposed between the body of the switching element and the support plate inner surface.

When the gap filler is interposed between the body of the switching element and the support plate inner surface, a distance between the body of the switching element and the support plate inner surface may be formed greater than a distance between the body of the switching element and the support plate inner surface when the thermal grease is interposed between the body of the switching element and the support plate inner surface.

The second resin member second portion may further include a boss portion on which the printed circuit board is seated.

An area in which the resin member is injected to the inverter body and united thereto may be a surface which is modified before injection of the resin member.

The surface modifying of the inverter body may be performed after form fabrication of the inverter body.

The housing may further include a motor housing having a motor receiving space configured to receive the motor, and an inverter cover configured to cover a space in which the inverter is received on an opposite side of the motor housing based on the inverter body, a spacer may be interposed between the inverter cover and the printed circuit board of the inverter, and the printed circuit board may be fixed together with the inverter cover by at least one among a first fastening member penetrating the inverter cover, the spacer, and the printed circuit board to be fastened to the inverter body, and a second fastening member penetrating the inverter cover, the spacer, the printed circuit board, and the inverter body to be fastened to the motor housing.

DETAILED DESCRIPTION OF THE PREFERRED EMBODIMENT

Hereinafter, an electric compressor according to the present disclosure will be described in detail with reference to the accompanying drawings.

Figure 1:
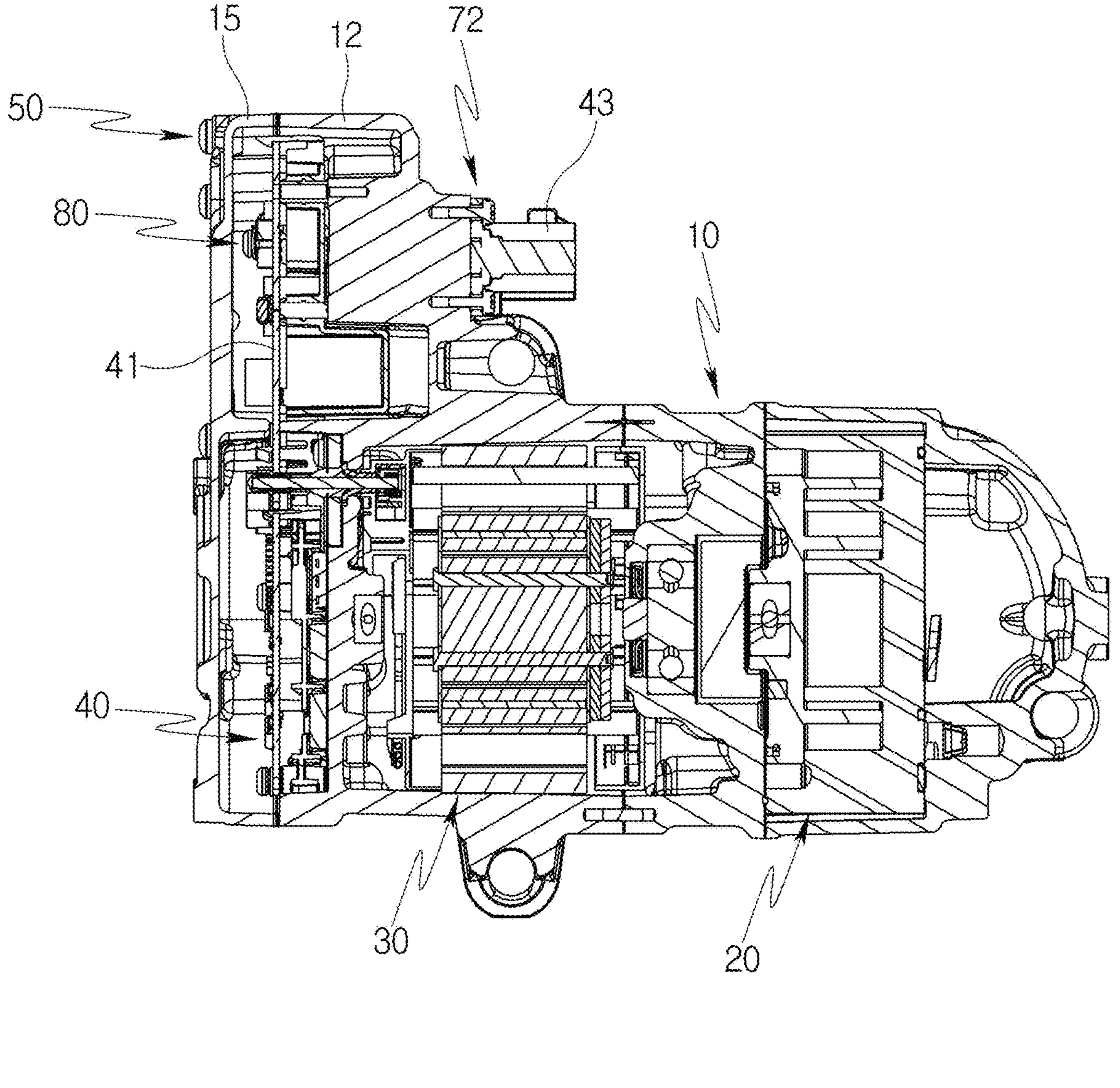
FIG. 1 PRIOR ART
FIG. 1 is a cross-sectional view illustrating a conventional electric compressor.
Figure 2:
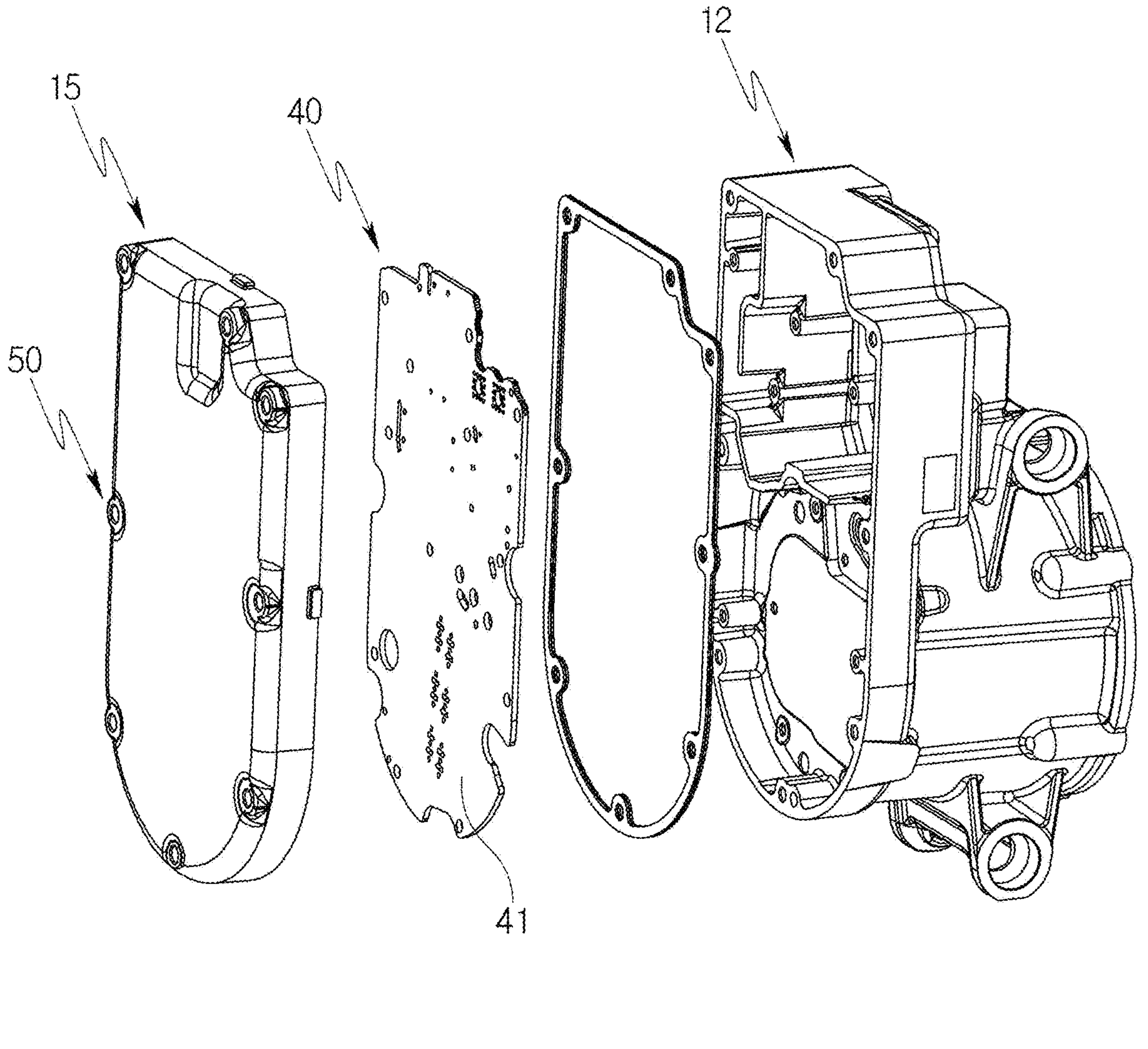
FIG. 2 PRIOR ART
FIG. 2 is an exploded cross-sectional view illustrating an inverter side of the electric compressor of FIG. 1.
Figure 3:
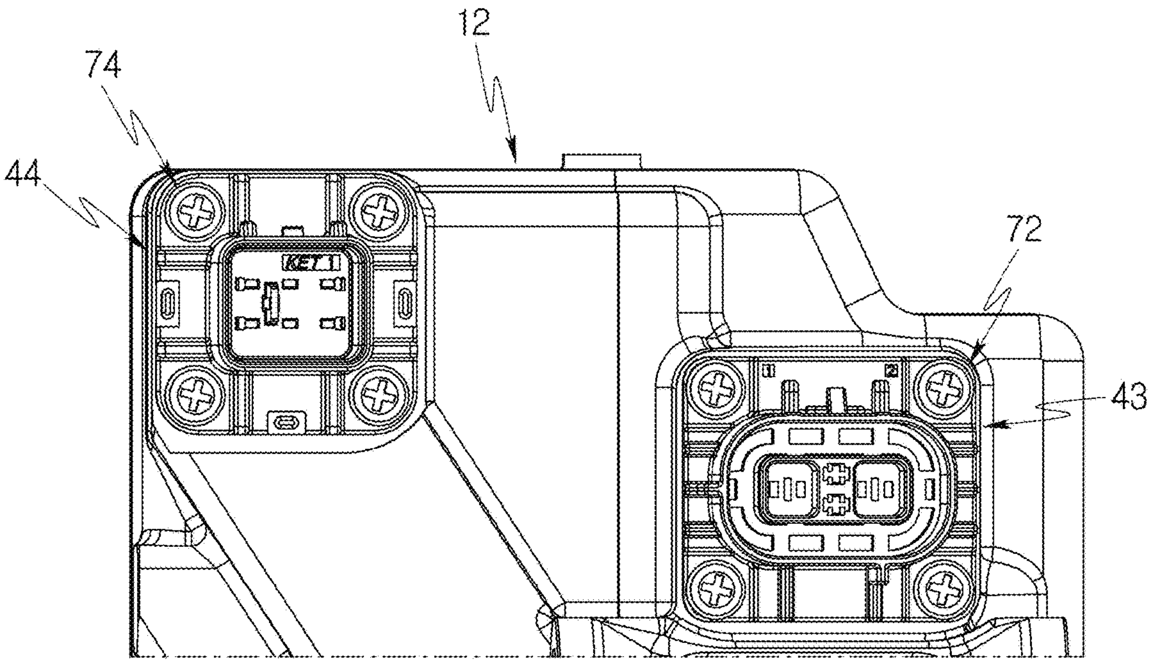
FIG. 3 PRIOR ART
FIG. 3 is a right side view illustrating connectors of the electric compressor of FIG. 1.
Figure 4:
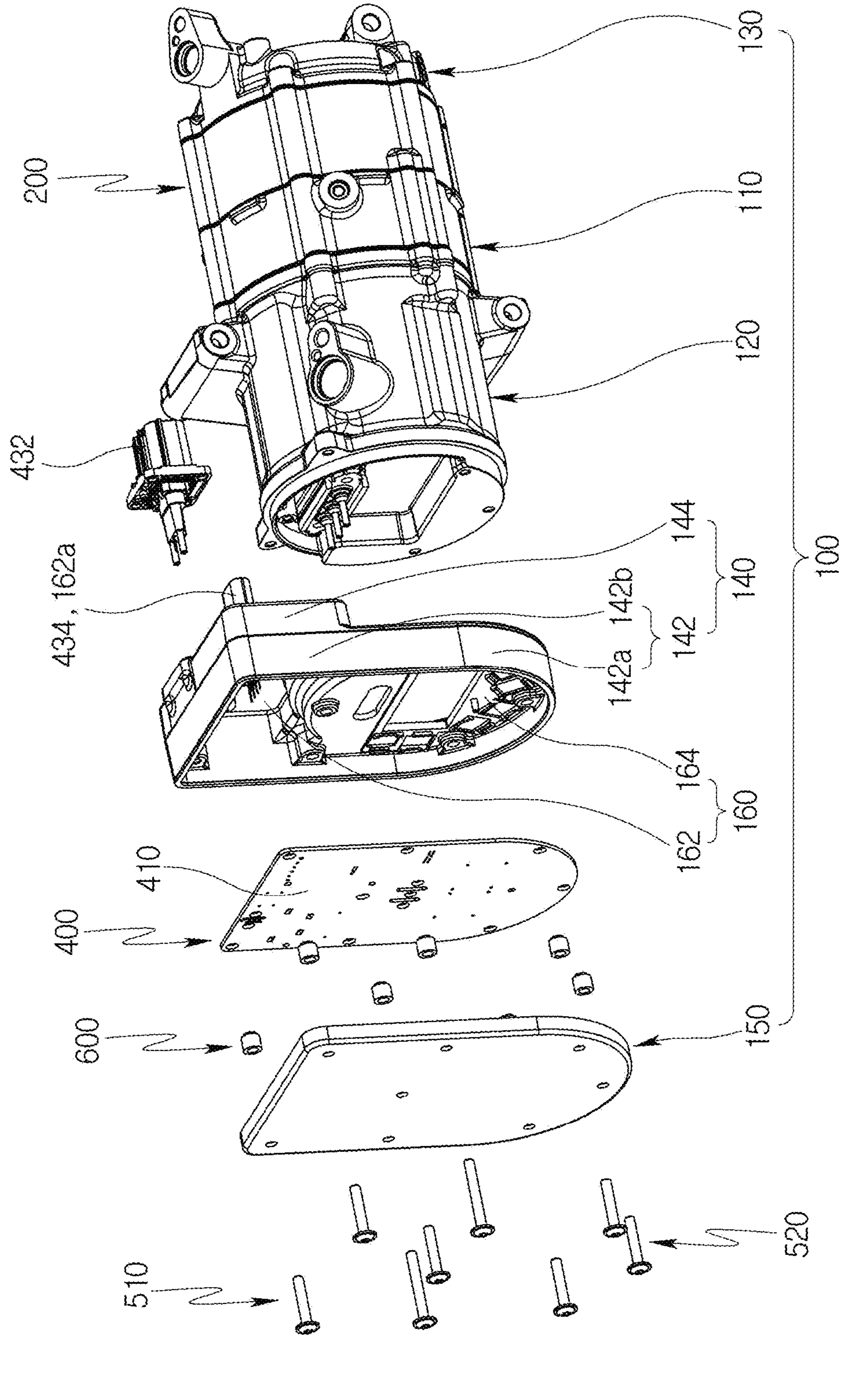
FIG. 4 is an exploded cross-sectional view illustrating an electric compressor according to an embodiment of the present disclosure.
Figure 5:
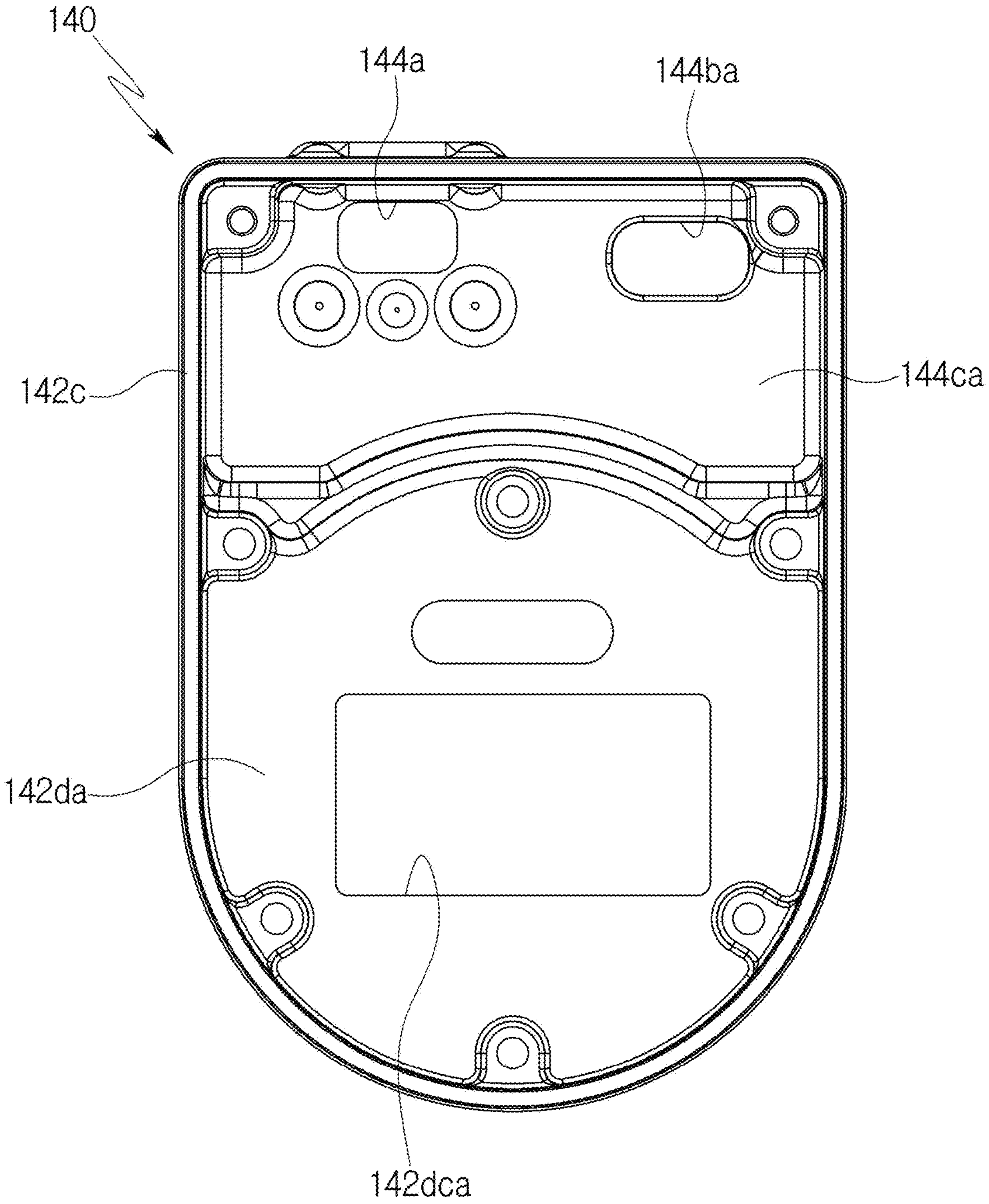
FIG. 5 is a front view illustrating an inverter body in an electric compressor of FIG. 4.
Figure 6:
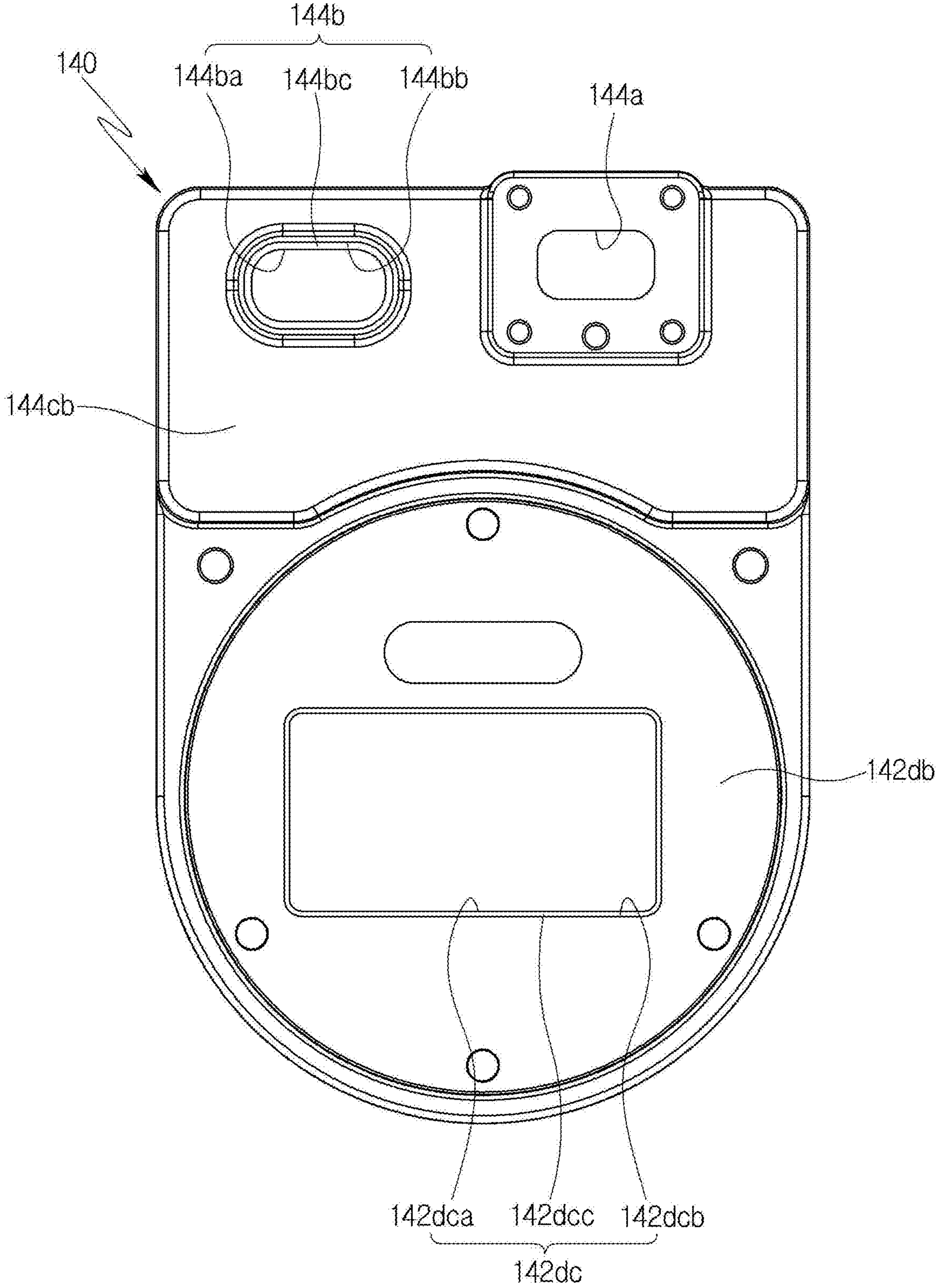
FIG. 6 is a rear view of FIG. 5.
Figure 7:
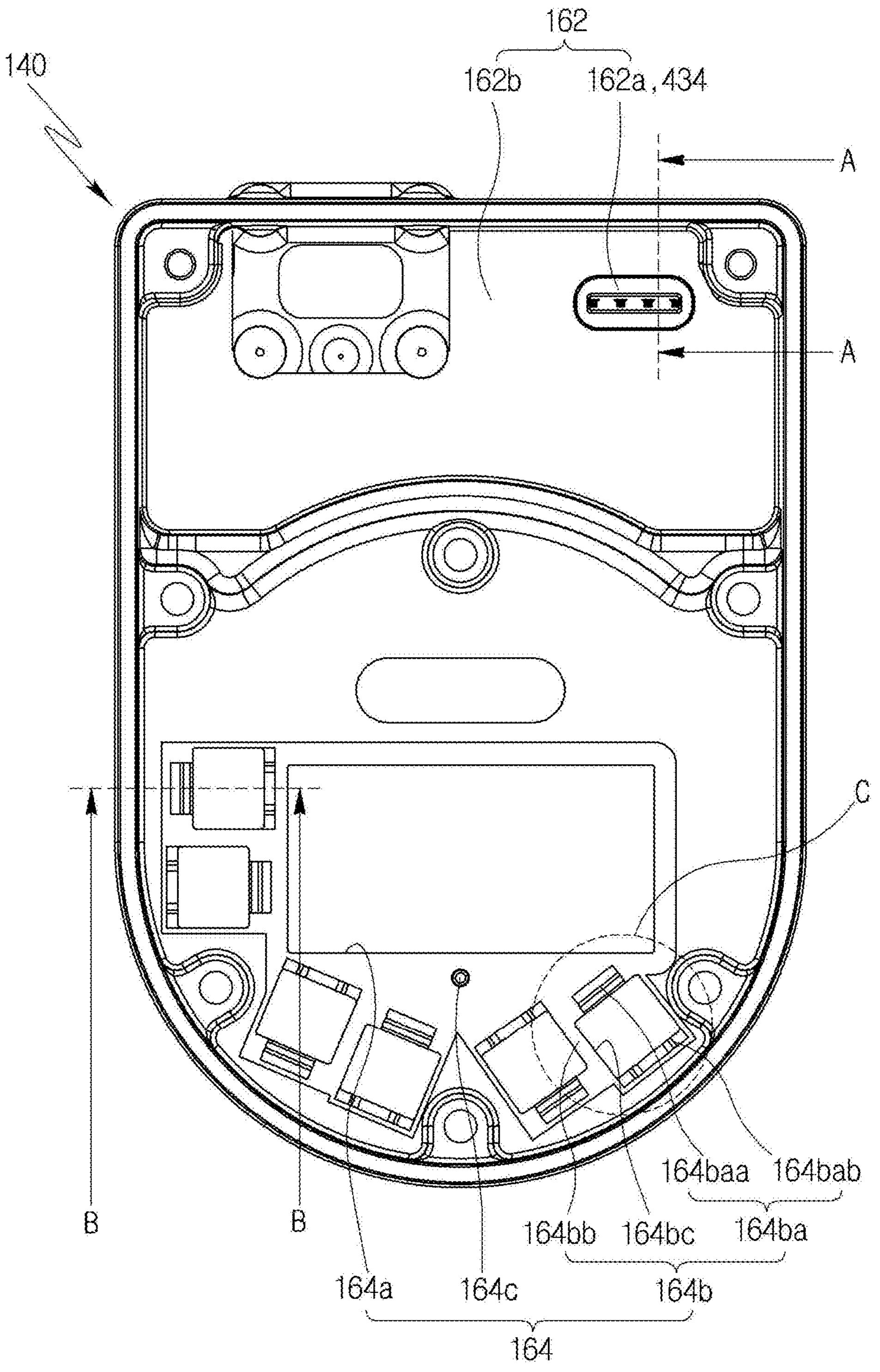
FIG. 7 is a front view illustrating a resin member injected to an inverter body of FIG. 5.
Figure 8:
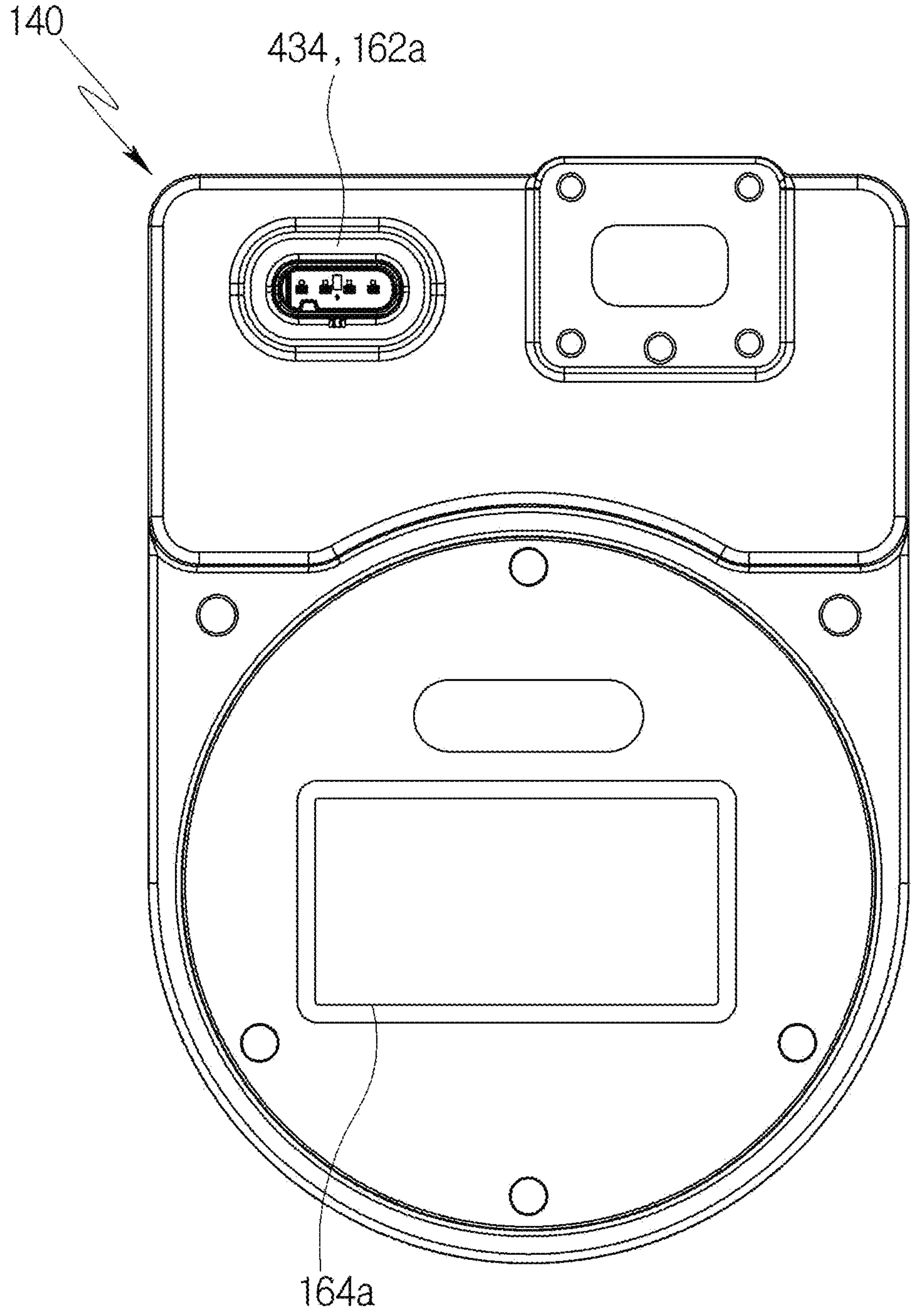
FIG. 8 is a rear view of FIG. 7.
Figure 9:
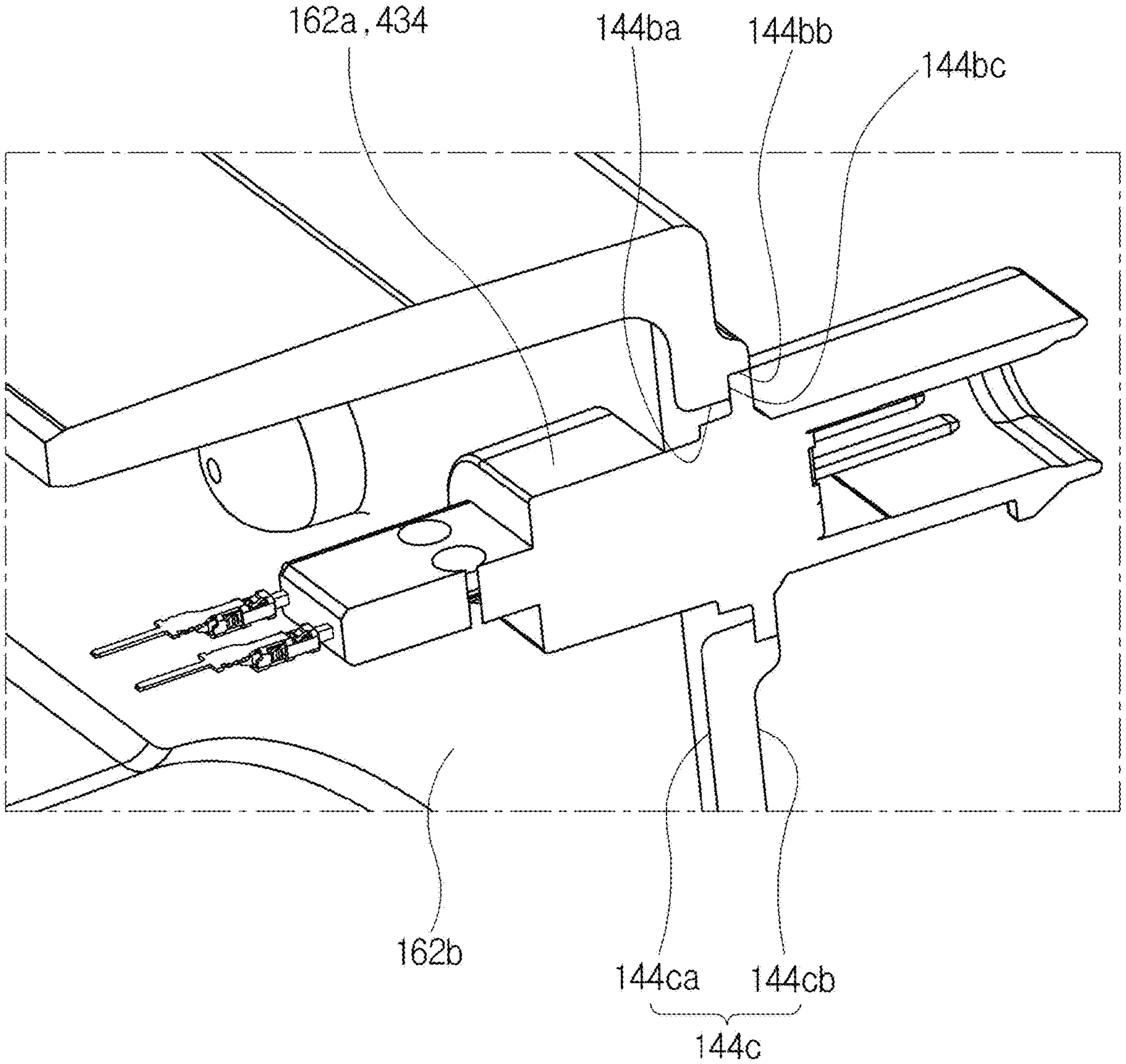
FIG. 9 is a perspective view taken along A-A of FIG. 7.
Figure 10:
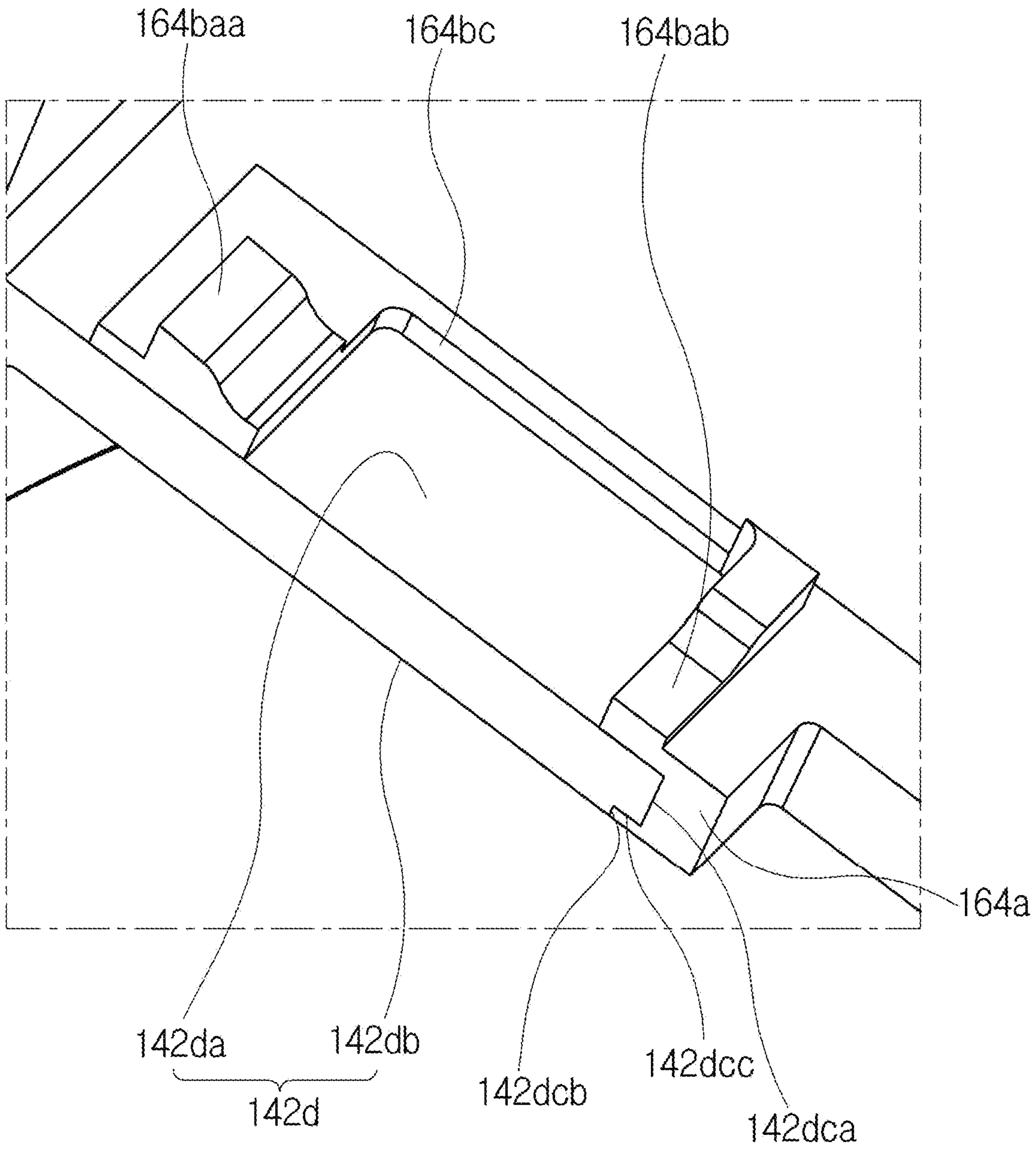
FIG. 10 is a perspective view taken along B-B of FIG. 7.
Figure 11:
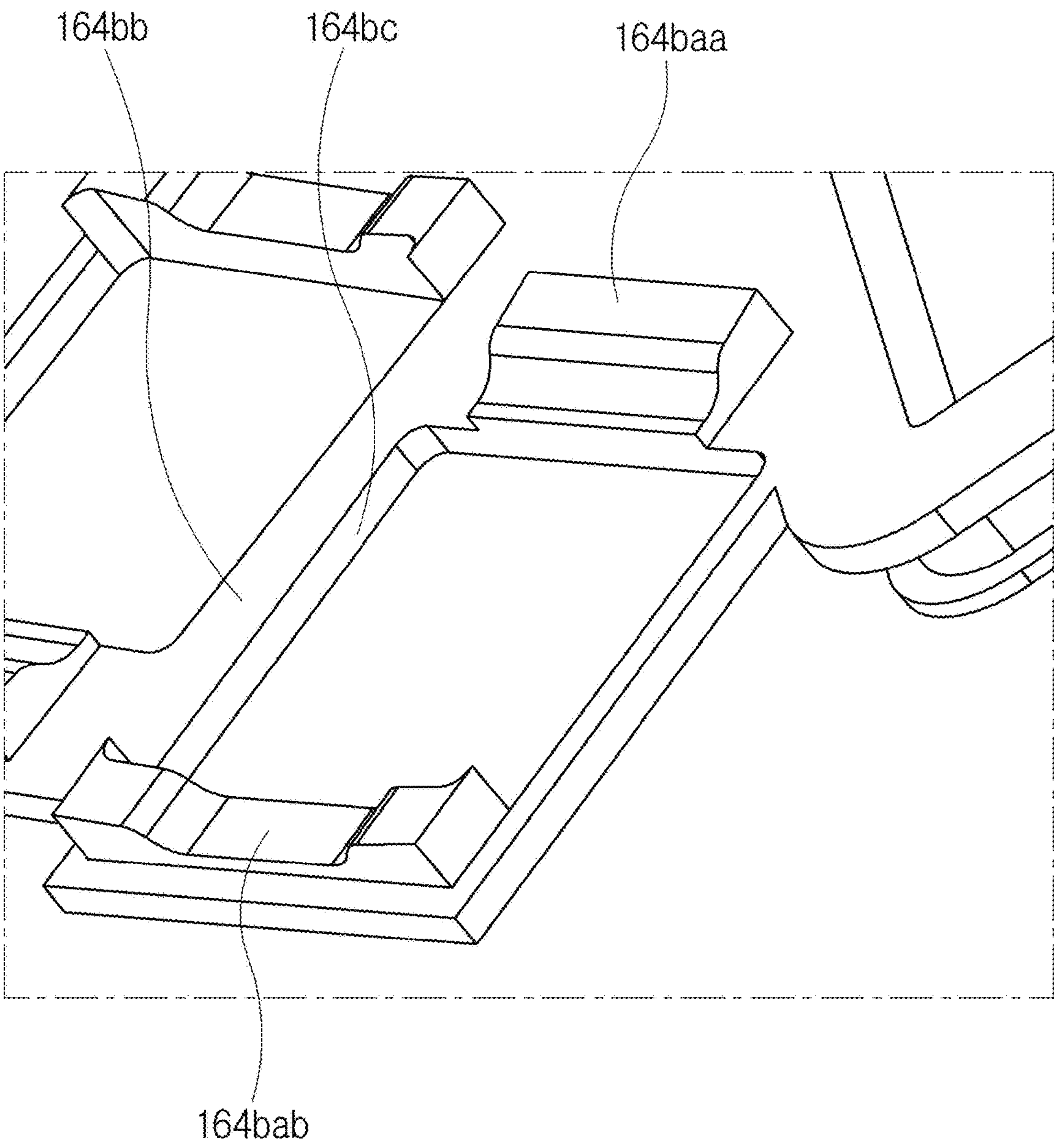
FIG. 11 is a perspective view of C part in FIG. 7.
Figure 12:
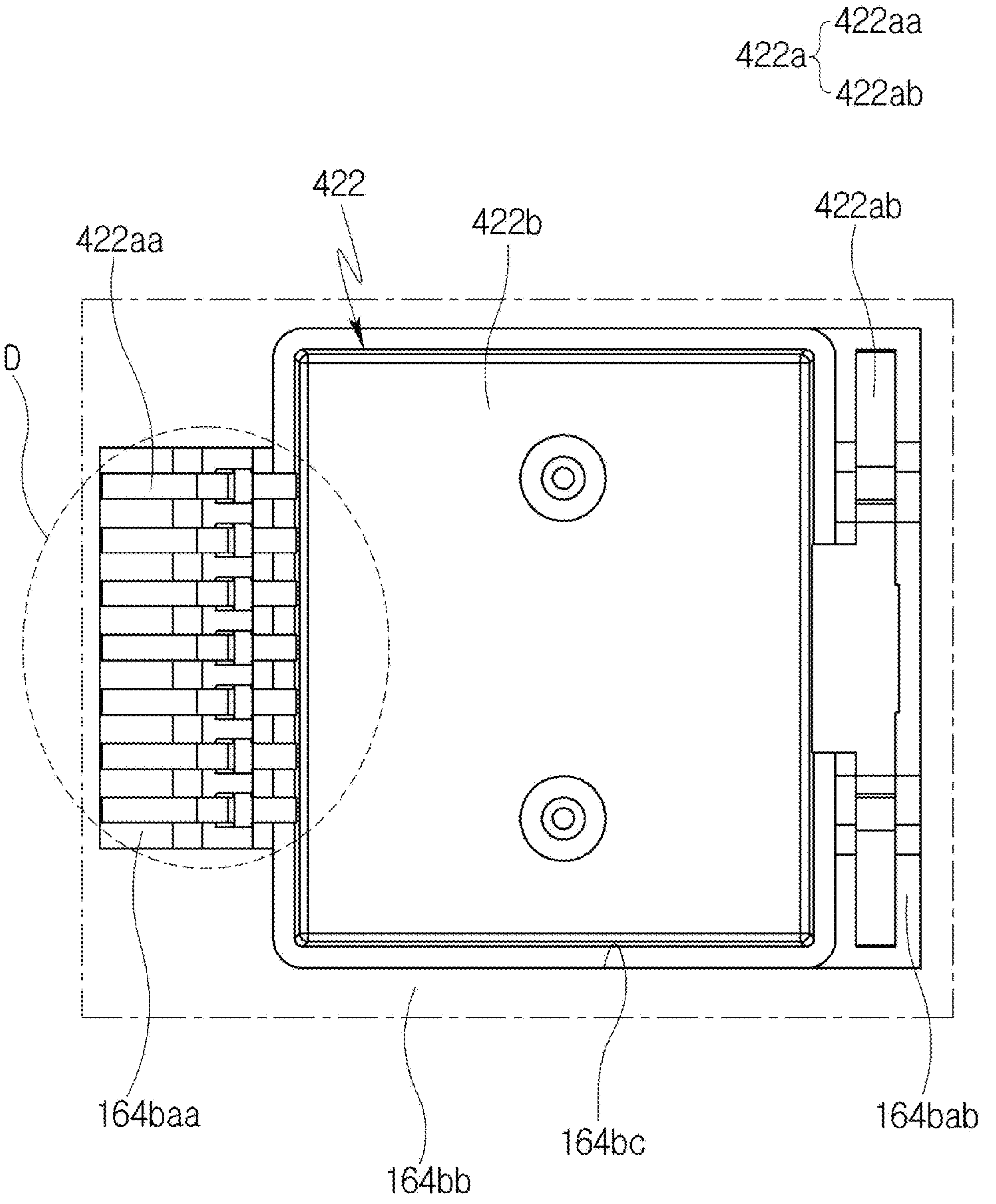
FIG. 12 is a front view illustrating a switching element received in C part in FIG. 7.
Figure 13:
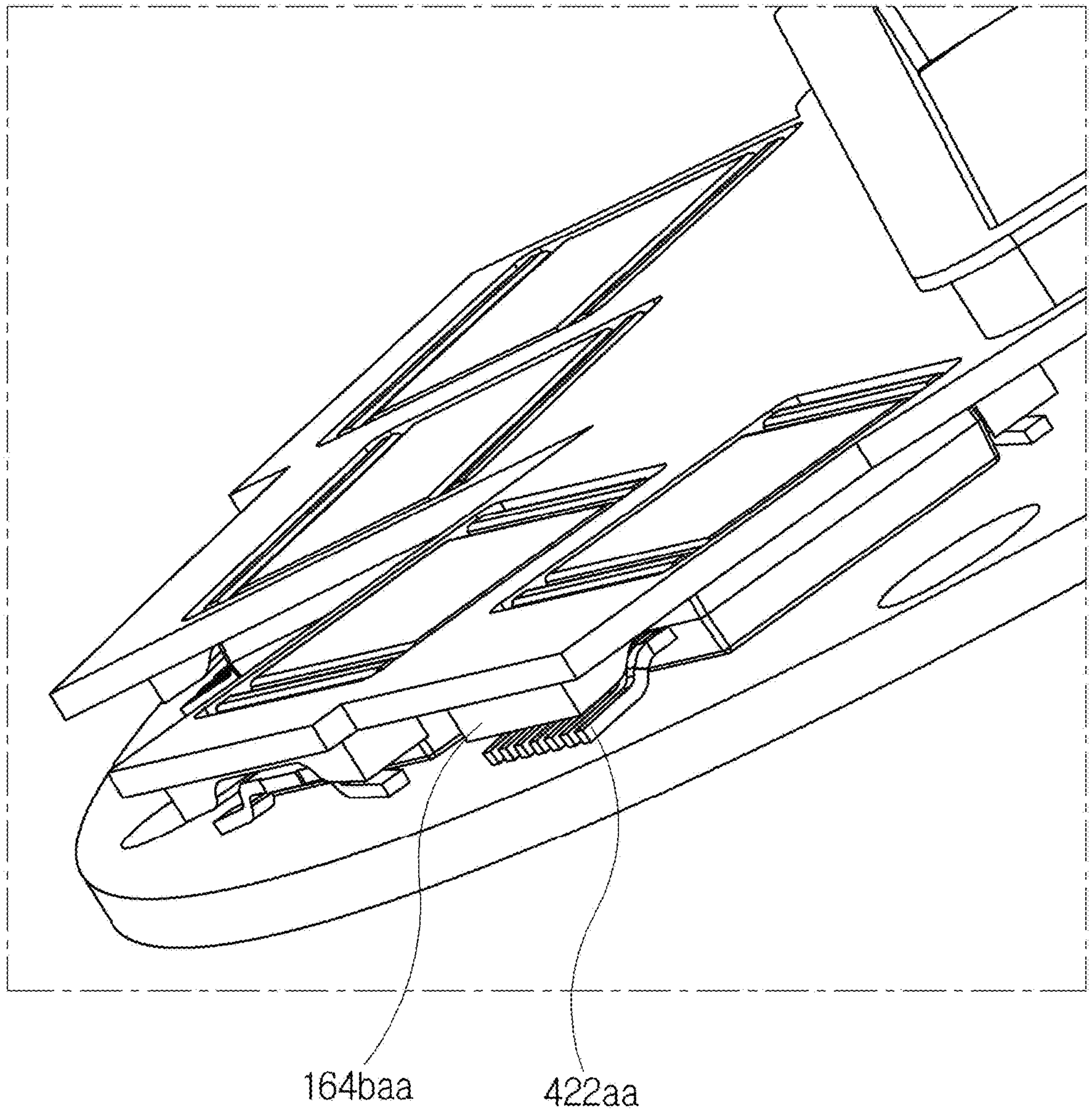
FIG. 13 is a perspective view of D part in FIG. 12.
Figure 14:
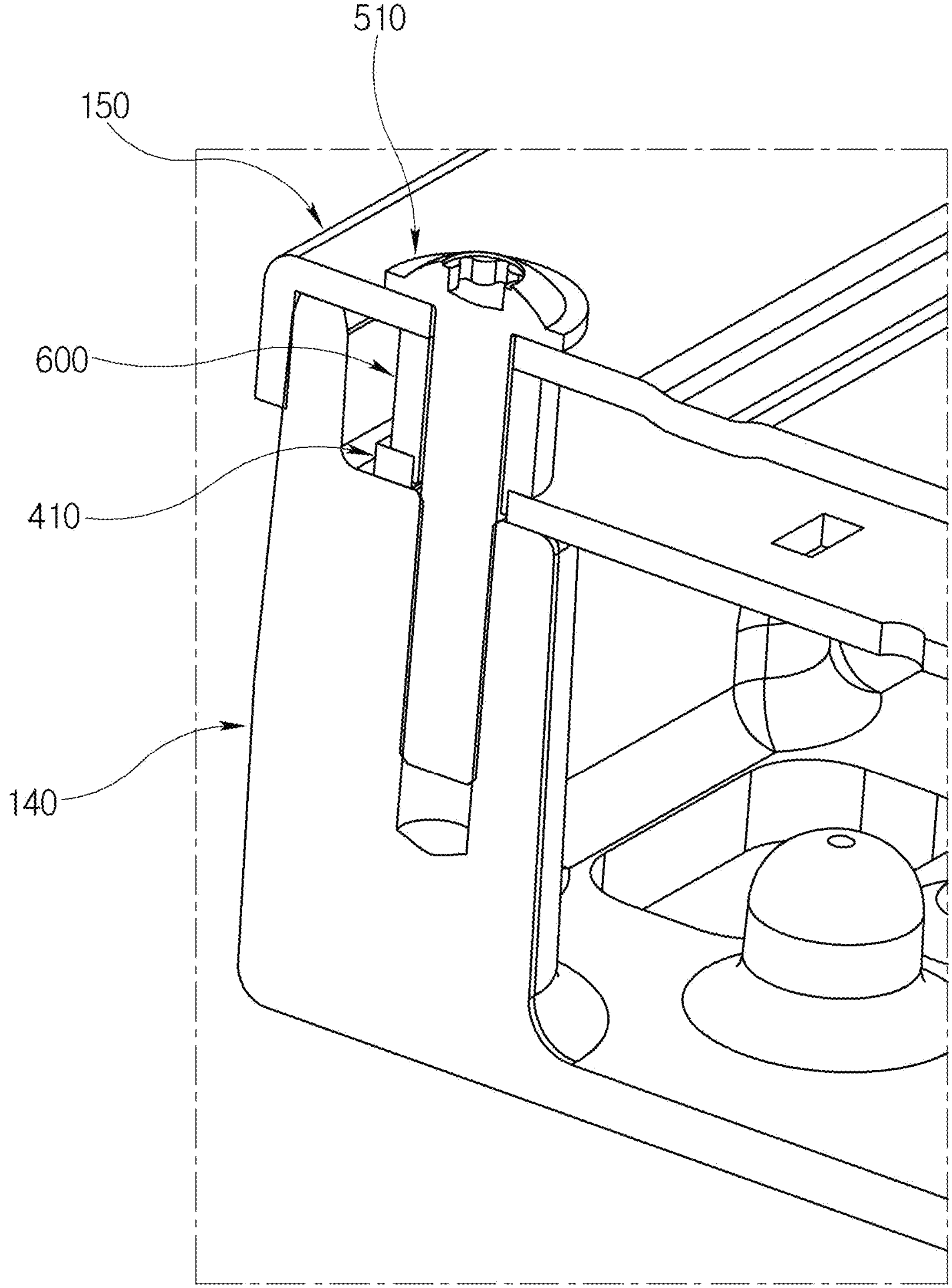
FIG. 14 is a perspective view illustrating a state in which an inverter cover and a printed circuit board are fixed by a fastening member and a spacer in an electric compressor of FIG. 4.

FIG. 4 is an exploded cross-sectional view illustrating an electric compressor according to an embodiment of the present disclosure, FIG. 5 is a front view illustrating an inverter body in an electric compressor of FIG. 4, FIG. 6 is a rear view of FIG. 5, FIG. 7 is a front view illustrating a resin member injected to an inverter body of FIG. 5, FIG. 8 is a rear view of FIG. 7, FIG. 9 is a perspective view taken along A-A of FIG. 7, FIG. 10 is a perspective view taken along B-B of FIG. 7, FIG. 11 is a perspective view of C part in FIG. 7, FIG. 12 is a front view illustrating a switching element received in C part in FIG. 7, FIG. 13 is a perspective view of D part in FIG. 12, and FIG. 14 is a perspective view illustrating a state in which an inverter cover and a printed circuit board are fixed by a fastening member and a spacer in an electric compressor of FIG. 4.

Referring to FIGS. 4 to 14, the electric compressor according to an embodiment of the present disclosure may include: a housing 100; a compression mechanism 200 configured to compress a refrigerant in the housing 100; a motor configured to generate power needed for drive of the compression mechanism 200; and an inverter 400 configured to control the motor.

The housing 100 may include a center housing 110 which supports the compression mechanism 200, a front housing 120 coupled to the center housing 110 and forming a motor receiving space in which the motor 300 is received and thus, also referred to as a motor housing (hereinafter, a motor housing 120), a rear housing 130 disposed on an opposite side of the center housing 110 with respect to the compression mechanism 200 and having a discharge chamber accommodating a refrigerant discharged from the compression mechanism 200, an inverter body 140 coupled to the motor housing 120 on an opposite side of the center housing 110 with respect to the motor housing 120 and forming an inverter receiving space in which the inverter 400 is received, and an inverter cover 150 coupled to the inverter body 140 on an opposite side of the motor housing 120 with respect to the inverter body 140 and configured to cover the inverter receiving space.

The compression mechanism 200 may include a fixed scroll fixedly installed in the housing 100, and an orbiting scroll engaged with the fixed scroll 210 to form a compression chamber together with the fixed scroll and configured to be orbited by a rotational axis configured to deliver power from the motor to the compression mechanism 200.

Here, in the present embodiment, the compression mechanism 200 is formed as a so-called scroll type, but is not limited thereto, and may be configured as other types such as a reciprocating type and a vane rotary type.

The motor may include a stator supported by the motor housing 120, and a rotor positioned inside the stator and configured to be rotated by an interaction with the stator, and the rotor may be press-inserted into the rotational axis.

The inverter 400 may include a printed circuit board 410 on which a plurality of elements are mounted and connectors 432 and 434 for connecting the printed circuit board 410 to an external device.

The plurality of elements includes a switching element 422 having a function of opening and closing a circuit, and the switching element 422 may be formed as a metal-oxide-semiconductor field-effect transistor (MOSFET) which controls electric power.

In addition, the plurality of elements includes a filter element configured to identify an electric signal by a frequency, and the filter element may be formed as a capacitor, for example.

The connectors 432 and 434 may include a high-voltage connector 432 connected to a high-voltage conduction unit for supplying electric power to the inverter 400, and a low-voltage connector 434 connected to a low-voltage conduction unit for communication with the inverter 400.

Here, the high-voltage connector 432 may be separately formed and may be connected to the inverter body 140 by a fastening member because a structure thereof is complex, however, the low-voltage connector 434 of which the structure thereof is relatively simple may be formed to be coupled to the inverter body 140 without a fastening member.

In more detail, the inverter body 140 may include a printed circuit board receiving part 142 configured to receive the printed circuit board 410, and a connector receiving part 144 configured to receive the connectors 432 and 434.

The printed circuit board receiving part 142 may include a circular portion 142*a* facing the motor housing 120, and a protrusion 142*b* radially protruding from the circular portion 142*a*.

The connector receiving part 144 may protrude from the protrusion 142*b* toward the motor housing 120 in a radial direction.

In addition, the connector receiving part 144 may include a high-voltage connector hole 144*a* penetrated by the high-voltage connector 432, a low-voltage connector hole 144*b* penetrated by the low-voltage connector 434, and a connector plate 144*c* on which the high-voltage connector hole 144*a* and the low-voltage connector hole 144*b* are formed.

Moreover, the connector plate 144*c* includes a connector plate inner surface 144*ca* oriented toward the printed circuit board 410, and a connector plate outer surface 144*cb* forming a rear surface of the connector plate inner surface 144*ca*. Each of the high-voltage connector hole 144*a* and the low-voltage connector hole 144*b* is formed by penetrating the connector plate 144*c* from the connector plate inner surface 144*ca* to the connector plate outer surface 144*cb*, and the high-voltage connector 432 is separately formed and inserted into the high-voltage connector hole 144*a* and coupled to the connector plate 144*c* by the fastening member, whereas the low-voltage connector 434 may be formed such that in a state in which a conductive component is received in the connector hole 144*b*, the resin member 160 is injected to the low-voltage connector hole 144*b* and the conductive component. That is, the resin member 160 is integrally formed with the low-voltage connector 434, and is bonded to the connector plate 144*c*.

Here, the low-voltage connector hole 144*b* may include an inner low-voltage connector hole 144*ba* recessed from the connector plate inner surface 144*ca* and an outer low-voltage connector hole 144*bb* recessed from the connector plate outer surface 144*cb* and communicated with the inner low-voltage connector hole 144*ba* so as to suppress deviation of the resin member 160 from the connector plate 144*c*. In addition, a low-voltage connector hole stepped surface 144*bc* may be formed between the outer low-voltage connector hole 144*bb* and the inner low-voltage connector hole 144*ba* as an inner diameter of the outer low-voltage connector hole 144*bb* is formed greater than an inner diameter of the inner low-voltage connector hole 144*ba*.

Moreover, deviation of the resin member 160 from the connector plate 144*c* may be suppressed because the resin member 160 is injected to a portion surrounding the inner connector hole 144*ba* of the connector plate inner surface 144*ca*, the inner low-voltage connector hole 144*ba*, the low-voltage connector hole stepped surface 144*bc*, and the outer low-voltage connector hole 144*bb*, and is supported on the connector plate inner surface 144*ca* and the low-voltage connector hole stepped surface 144*bc*.

Meanwhile, the plurality of elements further includes an element disposed around the connectors 432 and 434, and the resin member 160 may be formed to be able to insulate between the element disposed around the connectors 432 and 434 and the connector plate inner surface 144*ca*. That is, the resin member 160 includes a first resin member 162 injected to the connector receiving part 144 and united thereto, and the first resin member 162 includes a first resin member first portion 162*a* injected to the portion surrounding the inner connector hole 144*ba* of the connector plate inner surface 144*ca*, the inner low-voltage connector hole 144*ba*, the low-voltage connector hole stepped surface 144*bc*, and the outer low-voltage connector hole 144*bb*, and integrally formed with the low-voltage connector 434 and bonded to the connector plate 144*c*, and the first resin member 162 may further include a first resin member second portion 162*b* injected to a portion spaced apart from a portion surrounding the inner connector (432 and 434) hole of the connector plate inner surface 144*ca* and interposed between an element needing insulation with the connector plate inner surface 144*ca* and the connector plate inner surface 144*ca*.

Here, the first resin member second portion 162*b* is integrally formed with the first resin member first portion 162*a*, and deviation thereof from the connector plate 144*c* may be suppressed.

In addition, the resin member 160 may further include a second resin member 164 injected to the printed circuit board receiving part 142 and united thereto.

In more detail, the printed circuit board receiving part 142 may include an annular side plate 142*c* extending along an outer circumferential portion of the protrusion 142*b* and the circular portion 142*a* and forming a space receiving the printed circuit board 410, and a support plate 142*d* radially extending from an inner circumferential portion of the side plate 142*c* in an area of the circular portion 142*a* and supporting the printed circuit board 410, and the resin member 160 may further include the second resin member 164 injected to the support plate 142*d* and united thereto.

Here, the support plate 142*d* may include a support plate inner surface 142*da* oriented toward the printed circuit board 410, a support plate outer surface 142*db* forming a rear surface of the support plate inner surface 142*da*, and an element receiving hole 142*dc* penetrating the support plate 142*d* from the support plate inner surface 142*da* to the support plate outer surface 142*db* and receiving the filter element so as to avoid interference with the filter element which is relatively high.

Moreover, the element receiving hole 142*dc* may include an inner element receiving hole 142*dca* recessed from the support plate inner surface 142*da* and an outer element receiving hole 142*dcb* recessed from the support plate outer surface 142*db* and communicated with the inner element receiving hole 142*dca*.

Furthermore, an element receiving hole stepped surface 142*dcc* may be formed between the outer element receiving hole 142*dcb* and the inner element receiving hole 142*dca* as an inner diameter of the outer element receiving hole 142*dcb* is formed greater than an inner diameter of the inner element receiving hole 142*dca*.

In addition, the second resin member 164 may include a second resin member first portion 164*a* injected to a portion surrounding the inner element receiving hole 142*dca* of the support plate inner surface 142*da*, the inner element receiving hole 142*dca*, the element receiving hole stepped surface 142*dcc*, and the outer element receiving hole 142*dcb* and united thereto.

Here, the second resin member first portion 164*a* is supported on the support plate inner surface 142*da* and the element receiving hole stepped surface 142*dcc*, and deviation thereof from the connector plate 144*c* may be suppressed. In addition, a second resin member second portion 164*b* which will be described below is integrally formed with the second resin member first portion 164*a*, deviation thereof from the support plate 142*d* may be suppressed.

Moreover, the second resin member 164 may further include the second resin member second portion 164*b* injected to a portion opposed to the switching element 422 of a portion spaced apart from a portion surrounding the element receiving hole 142*dc* and united thereto.

Furthermore, the second resin member second portion 164*b* may include a leadwire insulating portion 164*ba* interposed between the leadwire 422*a* of the switching element 422 and the support plate inner surface 142*da*.

Here, it is preferable that the leadwire insulating portion 164*ba* is spaced apart from the leadwire 422*a* by a predetermined distance in consideration that insulation coating is applied to a surface of the leadwire 422*a*.

In addition, the leadwire 422*a* may include a first leadwire 422*aa* protruding toward one side of the switching element 422, and a second leadwire 422*ab* protruding toward another side of the switching element 422, and the leadwire insulating portion 164*ba* may include a first leadwire insulating portion 164*baa* interposed between the first leadwire 422*aa* and the support plate inner surface 142*da* and a second leadwire insulating portion 164*bab* interposed between the second leadwire 422*ab* and the support plate inner surface 142*da*.

Moreover, the switching element 422 may be formed in plural number, and the leadwire insulating portion 164*ba* may be formed such that the first leadwire insulating portion 164*baa* with respect to a switching element 422 is adjacent to the second leadwire insulating portion 164*bab* with respect to a switching element 422 adjacent to the switching element 422, and the second leadwire insulating portion 164*bab* with respect to the switching element 422 is adjacent to the first leadwire insulating portion 164*baa* with respect to a switching element 422 adjacent to the switching element 422.

Furthermore, the second resin member second portion 164*b* may further include an inter-switching element insulating portion 164*bb* interposed between a switching element 422 and a switching element 422 adjacent to the switching element 422.

In addition, the second resin member second portion 164*b* may further include a body exposing portion 164*bc* configured to expose a body 422*b* of the switching element 422 to the support plate inner surface 142*da*.

Here, a thermal grease may be interposed between the body 422*b* of the switching element 422 and the support plate inner surface 142*da*, and it is preferable that a distance between the body 422*b* of the switching element 422 and the support plate inner surface 142*da* is closer to zero (0) in consideration that viscosity of the thermal grease is low. However, in this case, the costs may increase because the support plate inner surface 142*da* needs to be precisely processed so as to manage the distance between the body 422*b* of the switching element 422 and the support plate inner surface 142*da*.

In consideration of the above, it is further preferable that a gap filler is interposed between the body 422*b* of the switching element 422 and the support plate inner surface 142*da* instead of the thermal grease, because management of the distance between the body 422*b* of the switching element 422 and the support plate inner surface 142*da* is easy and the support plate inner surface 142*da* does not need to be precisely processed, that is, the distance between the body 422*b* of the switching element 422 and the support plate inner surface 142*da* when the gap filter is interposed between the body 422*b* of the switching element 422 and the support plate inner surface 142*d* can be formed greater than the distance between the body 422*b* of the switching element 422 and the support plate inner surface 142*da* when the thermal grease is interposed between the body 422*b* of the switching element 422 and the support plate inner surface 142*d*.

Moreover, the second resin member second portion 164*b* may further include a boss portion 164*c* on which the printed circuit board 410 is seated, and the printed circuit board 410 may be united with the boss portion 164*c* after being seated on the boss portion 164*c*.

Here, the printed circuit board 410 may be fixed by the boss portion 164*c*, however, use of a fastening member is recommended to ensure more stable fix of the printed circuit board 410. However, it may be preferable that the printed circuit board 410 is fixed by the fastening member so as to suppress increase of the costs. That is, the spacer is interposed between the inverter cover 150 and the printed circuit board 410, and it is preferable that the printed circuit board 410 is fixed together with the inverter cover 150 by at least one among a first fastening member 510 penetrating the inverter cover 150, the spacer 600, and the printed circuit board 410 to be fastened to the inverter body 140 and a second fastening member 520 penetrating the inverter cover 150, the spacer 600, the printed circuit board 410, and the inverter body 140 to be fastened to the motor housing 120.

For your information, the spacer 600 may suppress the movement of the printed circuit board 410 in a direction closer to or away from the inverter cover 150.

Hereinafter, the functions and effects of the electric compressor will be described.

That is, when power is applied to the motor, a low-temperature low-pressure refrigerant is introduced into the motor receiving space through a suction port formed in the motor housing 120, and the refrigerant in the motor receiving space is introduced into the compression mechanism 200, compressed into a high-temperature and high-pressure refrigerant, and discharged to the outside of the housing 100 through the discharge chamber.

In addition, as the motor is controlled by the inverter 400, the cooling efficiency may be variably controlled.

Here, the electric compressor according to the present embodiment may save the costs required for assembling the inverter 400 because the housing 100 includes the resin member 160 injected to the inverter body 140 and united thereto.

In more detail, the resin member 160 includes the first resin member 162 injected to the connector receiving part 144 and united thereto, and the first resin member 162 includes the first resin member first portion 162*a* integrally formed with the low-voltage connector 434 and bonded to the connector receiving part 144, thereby costs required for forming the low-voltage connector 434 and fixing it to the connector receiving part 144 can be saved.

In addition, the first resin member 162 further includes the first resin member second portion 162*b* extending from the first resin member first portion 162*a*, thereby the costs can be more saved because insulation between an element disposed around the connectors 432 and 434 and the connector plate 144*c* can be secured without an additional insulation paper.

Moreover, the resin member 160 further includes the second resin member 164 injected to the printed circuit board receiving part 142 and united thereto, and the second resin member 164 includes the second resin member first portion 164*a* injected to the element receiving hole 142*dc* and united thereto, thereby the cost increase can be suppressed and the insulation between the film element and the support plate 142*d* can be secured.

In addition, the second resin member 164 further includes the second resin member second portion 164*b* extending from the second resin member first portion 164*a*, and the second resin member first portion 164*a* includes the leadwire insulating portion 164*ba*, thereby the cost increase can be suppressed and the insulation between the leadwire 422*a* of the switching element 422 and the support plate 142*d* can be secured.

Furthermore, when the switching element 422 is formed in plural number, the leadwire insulating portion 164*ba* includes the first leadwire insulating portion 164*baa* and the second leadwire insulating portion 164*bab*, and the leadwire insulating portion 164*ba* is formed such that the first leadwire insulating portion 164*baa* with respect to a switching element 422 is adjacent to the second leadwire insulating portion 164*bab* with respect to a switching element 422 adjacent to the switching element 422, and the second leadwire insulating portion 164*bab* with respect to the switching element 422 is adjacent to the first leadwire insulating portion 164*baa* with respect to a switching element 422 adjacent to the switching element 422. Therefore, the cost increase can be suppressed and the insulation between the switching elements adjacent to each other can be secured.

Furthermore, the second resin member second portion 164*b* further includes the inter-switching element insulating portion 164*bb* interposed between a switching element 422 and a switching element 422 adjacent to the switching element 422, and the cost increase can be suppressed and the insulation between the switching elements adjacent to each other can be secured.

Meanwhile, an area in which the resin member 160 is injected to the inverter body 140 and united thereto is a surface to which a modification process such as a plasma processing is performed before injection of the resin member 160, and in such a case, a bonding strength between the resin member 160 and the inverter body 140 can be improved.

Here, when the area to which the surface modification is performed is contaminated, the bonding strength between the resin member 160 and the inverter body 140 can be degraded, and therefore, in order to prevent the contamination, the surface modification of the inverter body 140 is preferably performed after the form fabrication of the inverter body 140 where a cutting oil is used and chips are generated.

What is claimed is:

1. An electric compressor, comprising:

a housing;

a compression mechanism configured to compress a refrigerant in the housing;

a motor configured to generate power needed for driving the compression mechanism; and an inverter comprising a printed circuit board configured to control the motor and a connector configured to connect the printed circuit board to an external device, wherein the housing comprises an inverter body which comprises a printed circuit board receiving part configured to receive the printed circuit board and a connector receiving part configured to receive the connector so as to receive the inverter, wherein the electric compressor further comprises a resin member injected to the inverter body and united thereto, wherein the resin member comprises a first resin member injected to the connector receiving part and united thereto, wherein the connector receiving part comprises a connector hole penetrated by the connector, and a connector plate in which the connector hole is formed, wherein the first resin member comprises a first resin member first portion integrally formed with the connector, and a first resin member second portion surrounding the first resin member first portion and formed on the connector plate around the connector hole, wherein the connector plate comprises a connector plate inner surface oriented toward the printed circuit board and a connector plate outer surface forming a rear surface of the connector plate inner surface, wherein the connector hole comprises an inner connector hole recessed from the connector plate inner surface and an outer connector hole recessed from the connector plate outer surface and communicated with the inner connector hole, wherein an inner diameter of the outer connector hole is formed greater than an inner diameter of the inner connector hole and a connector hole stepped surface is formed between the outer connector hole and the inner connector hole, and wherein the first resin member first portion is injected to a portion surrounding the inner connector hole of the connector plate inner surface, the inner connector hole, the connector hole stepped surface, and the outer connector hole and united thereto.

2. The electric compressor of claim 1, wherein elements mounted on the printed circuit board comprise an element which needs insulation with the connector plate, and wherein the first resin member second portion is disposed between the element which needs insulation with the connector plate and the connector plate.

3. The electric compressor of claim 1, wherein the connector plate comprises a connector plate inner surface oriented toward the printed circuit board, and wherein the first resin member second portion is injected to a portion surrounding the connector hole of the connector plate inner surface and united thereto.

4. The electric compressor of claim 1, wherein the resin member further comprises a second resin member injected to the printed circuit board receiving part and united thereto.

5. An electric compressor, comprising:

a housing;

a compression mechanism configured to compress a refrigerant in the housing;

a motor configured to generate power needed for driving the compression mechanism; and an inverter comprising a printed circuit board configured to control the motor and a connector configured to connect the printed circuit board to an external device, wherein the housing comprises an inverter body which comprises a printed circuit board receiving part configured to receive the printed circuit board and a connector receiving part configured to receive the connector so as to receive the inverter, wherein the electric compressor further comprises a resin member injected to the inverter body and united thereto, wherein the resin member comprises a first resin member injected to the connector receiving part and united thereto, and a second resin member injected to the printed circuit board receiving part and united thereto, wherein the printed circuit board receiving part comprises an annular side plate forming a space accommodating the printed circuit board and a support plate extending from an inner circumferential portion of the side plate and supporting the printed circuit board, wherein the support plate comprises an element receiving hole penetrating the support plate, and wherein the second resin member comprises a second resin member first portion formed in the element receiving hole and a second resin member second portion surrounding the second resin member first portion and formed on the support plate around the element receiving hole.

6. The electric compressor of claim 5, wherein the support plate further comprises a support plate inner surface oriented toward the printed circuit board and a support plate outer surface forming a rear surface of the support plate inner surface, wherein the element receiving hole comprises an inner element receiving hole recessed from the support plate inner surface, and an outer element receiving hole recessed from the support plate outer surface and communicated with the inner element receiving hole, wherein an inner diameter of the outer element receiving hole is formed greater than an inner diameter of the inner element receiving hole and an element receiving hole stepped surface is formed between the outer element receiving hole and the inner element receiving hole, and wherein the second resin member first portion is injected to a portion surrounding the inner element receiving hole of the support plate inner surface, the inner element receiving hole, the element receiving hole stepped surface, and the outer element receiving hole and united thereto.

7. The electric compressor of claim 5, wherein the support plate further comprises a support plate inner surface oriented toward the printed circuit board, and wherein the second resin member second portion is injected to a portion surrounding the element receiving hole of the support plate inner surface and united thereto.

8. The electric compressor of claim 7, wherein elements mounted on the printed circuit board comprise a plurality of switching elements, and wherein the second resin member second portion comprises a leadwire insulating portion interposed between a leadwire of the switching elements and the support plate inner surface.

9. The electric compressor of claim 8, wherein the leadwire insulating portion is spaced apart from the leadwire by a predetermined distance.

10. The electric compressor of claim 8, wherein the leadwire comprises a first leadwire protruding toward one side of the switching elements and a second leadwire protruding toward another side of the switching elements, wherein the leadwire insulating portion comprises a first leadwire insulating portion interposed between the first leadwire and the support plate inner surface and a second leadwire insulating portion interposed between the second leadwire and the support plate inner surface, and wherein the first leadwire insulating portion with respect to a first one of the switching elements is adjacent to the second leadwire insulating portion with respect to a second one of the switching elements adjacent to the first one of the switching elements, and the second leadwire insulating portion with respect to the second one of the switching elements is adjacent to the first leadwire insulating portion with respect to a third one of the switching elements adjacent to the switching element.

11. The electric compressor of claim 8, wherein the second resin member second portion further comprises an inter-switching element insulating portion interposed between a first one of the switching elements and a second one of the switching elements adjacent to the first one of the switching elements.

12. The electric compressor of claim 8, wherein the second resin member second portion further comprises a body exposing portion configured to expose a body of the switching elements to the support plate inner surface, and wherein a gap filler or a thermal grease is interposed between the body of the switching elements and the support plate inner surface.

13. The electric compressor of claim 12, wherein when the gap filler is interposed between the body of the switching elements and the support plate inner surface, a distance between the body of the switching elements and the support plate inner surface is formed greater than a distance between the body of the switching elements and the support plate inner surface when the thermal grease is interposed between the body of the switching elements and the support plate inner surface.

14. The electric compressor of claim 7, wherein the second resin member second portion further comprises a boss portion on which the printed circuit board is seated.

15. The electric compressor of claim 1, wherein an area in which the resin member is injected to the inverter body and united thereto is a surface which is modified before injection of the resin member.

16. The electric compressor of claim 15, wherein the surface modifying of the inverter body is performed after form fabrication of the inverter body.

17. An electric compressor, comprising:

a housing;

a compression mechanism configured to compress a refrigerant in the housing;

a motor configured to generate power needed for driving the compression mechanism; and an inverter comprising a printed circuit board configured to control the motor and a connector configured to connect the printed circuit board to an external device, wherein the housing comprises an inverter body which comprises a printed circuit board receiving part configured to receive the printed circuit board and a connector receiving part configured to receive the connector so as to receive the inverter, wherein the electric compressor further comprises a resin member injected to the inverter body and united thereto, wherein the housing further comprises a motor housing having a motor receiving space configured to receive the motor, and an inverter cover configured to cover a space in which the inverter is received on an opposite side of the motor housing based on the inverter body, wherein a spacer is interposed between the inverter cover and the printed circuit board of the inverter, and wherein the printed circuit board is fixed together with the inverter cover by at least one among a first fastening member penetrating the inverter cover, the spacer, and the printed circuit board to be fastened to the inverter body, and a second fastening member penetrating the inverter cover, the spacer, the printed circuit board, and the inverter body to be fastened to the motor housing.

* * * * *